No. 647,961. Patented Apr. 24, 1900.
J. HACKER.
CATTLE STANCHION.
(Application filed Jan. 5, 1900.)

(No Model.)

Witnesses
John Maupin.
Geo. H. Chandler.

Inventor
John Hacker
By his Attorneys,
C. A. Snow & Co.

THE NORRIS PETERS CO., PHOTO-LITHO., WASHINGTON, D. C.

UNITED STATES PATENT OFFICE.

JOHN HACKER, OF GREENLAKE, MICHIGAN, ASSIGNOR OF ONE-HALF TO ARTHUR M. HOOKER, OF SAME PLACE.

CATTLE-STANCHION.

SPECIFICATION forming part of Letters Patent No. 647,961, dated April 24, 1900.

Application filed January 5, 1900. Serial No. 492. (No model.)

*To all whom it may concern:*

Be it known that I, JOHN HACKER, a citizen of the United States, residing at Greenlake, in the county of Allegan and State of Michigan, have invented a new and useful Cattle-Stanchion, of which the following is a specification.

This invention relates to cattle-stanchions in general, and more particularly to that class which are employed in stalls, although the structure may as well be applied to a portable stanchion.

The object of the invention is to provide a structure which will be pivotally mounted, and will thus permit the greatest freedom of movement of the animal held therein, which will be cheap and simple of manufacture, and which may be readily adjusted for engagement and disengagement with respect to an animal and when properly adjusted will form a rigid structure.

Figure 1:
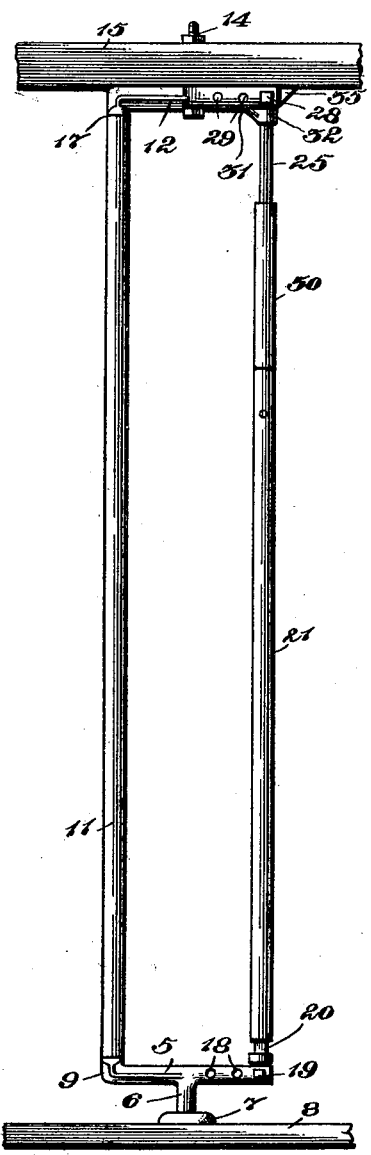
Figure 2:
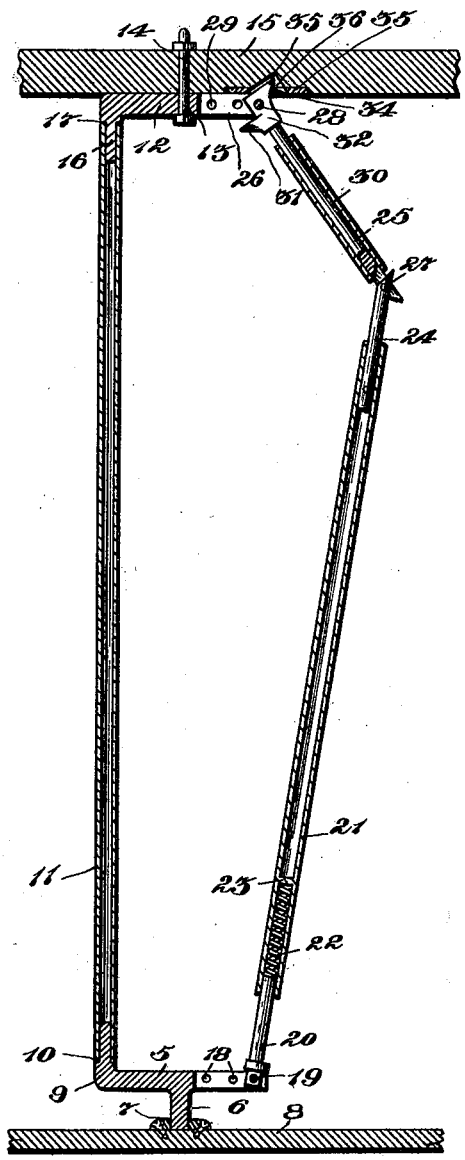

In the drawings, Figure 1 is an elevation showing the pivotally-mounted stanchion with its parts adjusted to hold an animal. Fig. 2 is a vertical section taken through the parts of the stanchion and showing the stanchion adjusted to receive or release an animal.

Referring now to the drawings, the stanchion of the present invention comprises a base-piece 5, having a trunnion 6 upon its underside and midway of its ends, this trunnion being adapted for rotation in a base-plate 7, which in turn is affixed to a sill 8 of the structure in which the stanchion is placed. The base-piece 5 has an upturned end 9, the upper portion of which is diminished in diameter to form a shoulder 10, upon which rests the lower end of a tubular upright 11, the lower end of which receives the diminished portion of the end 9.

A head-piece 12 has a perforation 13 midway of its ends, through which is passed a pivot-bolt 14, engaged with a beam 15 above the sill 8, this head-piece having a downturned end 16, the lower portion of which is diminished to form a shoulder 17, which receives the upper end of the tubular upright 11, which is disposed upon this downturned end. The tubular upright 11 is held upon the base-piece and head-piece by rivets, or in any other suitable manner.

The opposite end of the base-piece 5 is bifurcated vertically, and through this bifurcated portion are formed perforations 18, which are adapted to interchangeably receive a pivot-bolt 19, through the medium of which a short rod-section 20 is pivotally connected with the base-piece. This rod-section 20 enters and is slidable in a second tubular upright 21 and rests upon the lower end of a helical spring 22, the upper end of which bears against a stop 23 inside of the upright, and the spring 22 thus holds the upright 21 yieldably in an elevated position. In the upper end of the upright 21 is disposed a rod 24, held in place by riveting or in any other suitable manner, and the upper end of this rod lies between the bifurcations of the lower end of a cylindrical rod 25, the upper end of which lies between the bifurcations 26 at the end of the head-piece 12 opposite to the downturned end 16. The intermeshing ends of the rods 24 and 25 have a pivotal connection, as shown at 27, while the upper end of the rod 25 is pivoted to the head-piece by means of a bolt 28, which is adapted to engage perforations 29, formed in the bifurcated portion of the head-piece. Thus the upright 21 may be moved toward and away from the upright 11, during which operation the spring 22 will be compressed and released, respectively, and will hold the joint between the rods 24 and 25 broken after they have been moved to this position.

In order to hold the rods 24 and 25 and the upright 21 in mutual alinement and in operative relation to the upright 11, a sleeve 30 is slidably disposed upon the rod 25, and when the upright is in its operative position, above described, this sleeve may be moved or will drop into a position to engage both rods 24 and 25, and thus will prevent breaking of the joint. To prevent movement of the upright in the direction of the upright 11 beyond the parallel position, the mutually adjacent ends of the rods 24 and 25 are beveled, as illustrated in Fig. 2, to engage corresponding portions of the rods in a manner well understood, and to further prevent this excessive movement a shoulder 31 is formed upon the head 32 at the upper end of the rod 25 and engages the head-piece when the rod 25 is in the proper position. With this structure it will be seen that the upright 21 may be readily moved into and out of its operative relation to the upright 11 and when in a position to hold an animal may be securely locked in place with a mechanism which will permit easy unlocking. Furthermore, when an animal is held in the stanchion it may be rotated by the animal, and thus will permit greatest ease and freedom of movement. To prevent rotation of the stanchion when it is in its disengaged position, a plate 33 is fixed to the beam 15 and has a slot 34, with which is engaged a projection 35 upon the head 32 when the rod 25 is swung outwardly, a corresponding recess 36 being formed in the beam 15 to receive this projection of the head. It will of course be understood that in practice the stanchion may be made of any suitable material and may have any size and proportions that are desirable and that various modifications in the structure shown may be made without departing from the spirit of the invention.

What is claimed is—

1. A cattle-stanchion comprising a base-piece and a head-piece, a rod pivoted to the head-piece, an upright connecting the head-piece and the base-piece, a rod pivoted to the base-piece, a tube disposed upon the last-named rod and adapted to slide with respect thereto, a pivotal connection between the tube and the first-named rod, and a sleeve adapted to inclose said pivotal connection and extending at opposite sides thereof to hold the first rod and the tube rigid.

2. A cattle-stanchion comprising a head-piece and a base-piece having an upright rigidly connected therewith, a rod pivoted to the base-piece, a hollow upright disposed to slidably receive said rod, a spring in the hollow upright and bearing at one end upon the rod, a stop for the other end of the spring, a second rod pivoted to the head-piece and to the hollow upright, and a sleeve slidably mounted and adapted to inclose portions of the upright and of the rod pivoted thereto.

3. A cattle-stanchion comprising a head-piece and a base-piece pivotally mounted, an upright fixed to the head-piece and to the base-piece, an extensible upright pivoted to the base-piece, a rod pivoted to the head-piece and to the second upright, to permit movement of the second upright toward and away from the first-named upright, said rod having an extension to project beyond the head-piece and hold the stanchion against pivotal movement at times, said rod and second upright being adjustably connected with the head-piece and the base-piece for adjustment toward and away from the first upright.

4. A cattle-stanchion comprising a head-piece and a base-piece having an upright fixed thereto, an extensible upright pivoted to the base-piece, and a link pivotally connecting the second upright with the head-piece, said link and second upright being adjustably connected with the head-piece and base-piece, respectively, for adjustment bodily toward and away from the first upright.

5. A cattle-stanchion comprising a head-piece and a base-piece having an upright connected therewith, a second upright having pivotal connection with the base-piece and comprising telescopic sections, a rod pivotally connected to the head-piece and to a section of the second upright, and a sleeve adapted to inclose portions of the rod and the adjacent section of the second upright to hold them in mutual alinement.

In testimony that I claim the foregoing as my own I have hereto affixed my signature in the presence of two witnesses.

JOHN HACKER.

Witnesses:
 WM. G. HAM,
 GEORGE E. STEEBY.